United States Patent [19]
Faraboschi et al.

[11] Patent Number: 6,122,708
[45] Date of Patent: Sep. 19, 2000

[54] DATA CACHE FOR USE WITH STREAMING DATA

[75] Inventors: Paolo Faraboschi, Cambridge; Joseph A. Fisher, Brookline, both of Mass.

[73] Assignee: Hewlett-Packard Company, Palo Alto, Calif.

[21] Appl. No.: 08/911,709

[22] Filed: Aug. 15, 1997

[51] Int. Cl.[7] .................................................. G06F 12/00
[52] U.S. Cl. ........................ 711/118; 711/129; 711/147
[58] Field of Search ..................... 711/123, 129, 711/147, 118, 120, 125, 126, 119; 707/2

[56] References Cited

U.S. PATENT DOCUMENTS

| | | |
|---|---|---|
| 5,276,851 | 1/1994 | Thacker et al. |
| 5,561,780 | 10/1996 | Glew et al. ............................. 711/126 |
| 5,649,153 | 7/1997 | McNutt et al. ........................ 711/118 |
| 5,822,757 | 10/1998 | Chi ......................................... 711/129 |
| 5,829,028 | 10/1998 | Lynch et al. ............................ 711/126 |
| 5,875,464 | 2/1999 | Kirk ........................................ 711/129 |
| 5,875,465 | 2/1999 | Kilpatrick et al. .................... 711/134 |
| 5,954,812 | 9/1999 | Shiell et al. ............................. 712/39 |
| 5,974,506 | 10/1999 | Sicola et al. ........................... 711/120 |

OTHER PUBLICATIONS

The Cache Memory Book, Jim Handy, pp. 4–9, 1993.

Primary Examiner—John W. Cabeca
Assistant Examiner—Pierre-Michel Bataille

[57] ABSTRACT

A data cache system operates with an execution unit for processing data and a memory for storing data. The data cache system includes a data cache memory for temporarily storing data from the memory for access by the execution unit, and a controller. The controller reads and writes normal data in the entire cache memory in a normal mode and reads and writes streaming data in a streaming buffer in a streaming mode. The streaming buffer is a section of the data cache memory. The streaming buffer preferably has a capacity that is small in comparison with the capacity of the data cache memory. The normal data is characterized by temporal locality, whereas the streaming data is characterized by spatial locality. One or more bits of the data address are associated with the cache index in the normal mode and are associated with the tag in the streaming mode.

19 Claims, 6 Drawing Sheets

DATA CACHE FOR USE WITH STREAMING DATA

FIELD OF THE INVENTION

This invention relates to data cache memories used in central processing units of computers and, more particularly, to data cache memories configured for use with normal data and for buffering of streaming data.

BACKGROUND OF THE INVENTION

One well-known approach to improving the performance of computers is the use of a cache memory. Although a conventional random access memory (RAM) used for storage of instructions and data operates at high speed, the access time is slow in comparison with the operating speeds of computer execution units. Thus, memory access time may be the limiting factor in increasing the operating speed of a computer. By utilizing a cache memory, the limitations imposed by memory access time may be at least partially overcome.

A cache memory is connected between the execution unit and the main memory. The cache memory typically has a relatively small capacity and a faster access time than the main memory. When the execution unit is executing a program, it accesses data in the cache memory, thereby taking advantage of the speed of the cache memory. When the data is not present in the cache memory, the data is read from the main memory and is placed in the cache memory for subsequent use. When a significant percentage of accessed data is present in the cache memory, the operating speed of the computer is increased.

Conventional cache memories take advantage of a characteristic of the execution of many computer programs known as temporal locality. When program execution has temporal locality, the same data is used more than once, typically multiple times, in a relatively short period. This may occur, for example, in a program loop that is executed multiple times. When data having temporal locality is present in the cache memory, performance is enhanced. By contrast, a cache memory provides little or no speed improvement with respect to data having a small amount of temporal locality, and a cache memory provides no speed improvement with respect to data that is used only once during program execution.

In some applications, the execution unit may be required to perform operations in sequence on large volumes of data, as may be the case in processing pixel data representative of a large image. For example, a color image may be represented by 140 megabytes of data. The data may be stored in a burst memory that can deliver large quantities of data at high speed. However, the data must be buffered for use by the execution unit, because the burst memory does not supply data at the same rate that it is processed by the execution unit. The contents of a large data structure are consecutively supplied to the streaming buffer as streaming data until the entire data structure has been processed.

One known approach to buffering of streaming data is to pass the streaming data through the data cache memory of the computer, with the streaming data having access to the entire data cache. The streaming data is characterized by a high degree of spatial locality. Spatial locality in this context refers to address locality. The data in the streaming buffer typically consists of consecutive words from main memory (hence spatial locality). The streaming buffer has little or no temporal locality because of the size of the data structure and because the data may be processed only once. Large data sets having little or no temporal locality swamp the data cache memory and replace normal data. Thus, program code will be unable to use the data cache memory, and performance is likely to be degraded.

Another known approach is to use a data cache memory for normal data having temporal locality and a separate streaming buffer for streaming data. This approach has the disadvantage that separate data paths and addressing and translation circuitry are required for the data cache memory and the streaming buffer. In addition, two types of instructions are required for loading data, thereby increasing programming and/or compiler complexity.

All of the known techniques for buffering of streaming data have one or more disadvantages, including significant additional circuitry, degradation of performance under certain conditions and increased complexity in compilers and programming.

SUMMARY OF THE INVENTION

According to a first aspect of the invention, a data cache system is provided for operation with an execution unit for processing data and a memory for storing data. The data cache system comprises a data cache memory for temporarily storing data from the memory for access by the execution unit, and a data cache controller. The data cache controller reads and writes data having temporal locality in the entire data cache memory in a first mode and reads and writes data having spatial locality in a buffer in a second mode. The buffer comprises a section of the data cache memory and preferably has a capacity that is small in comparison with the capacity of the data cache memory. The data having temporal locality may be normal data associated with program execution, and the data having spatial locality may be streaming data from a large data structure.

The data cache memory includes a data cache and a tag array, and is accessed by an address including a tag and an index. The data cache controller preferably includes means for associating one or more bits of the address with the index in the first mode and for associating the same one or more bits of the address with the tag in the second mode.

According to another aspect of the invention, a method is provided for operating a data cache memory with an execution unit and a memory. The method comprises the steps of reading and writing data having temporal locality in the entire data cache memory in a first mode and reading and writing data having spatial locality in a buffer in a second mode. The buffer is a section of the data cache memory and preferably has a capacity that is small in comparison with the capacity of the data cache memory.

According to a further aspect of the invention, the capacity of the buffer may be varied from a minimum size to a maximum size. The minimum size of the buffer determines the number of additional bits that are associated with the tag.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
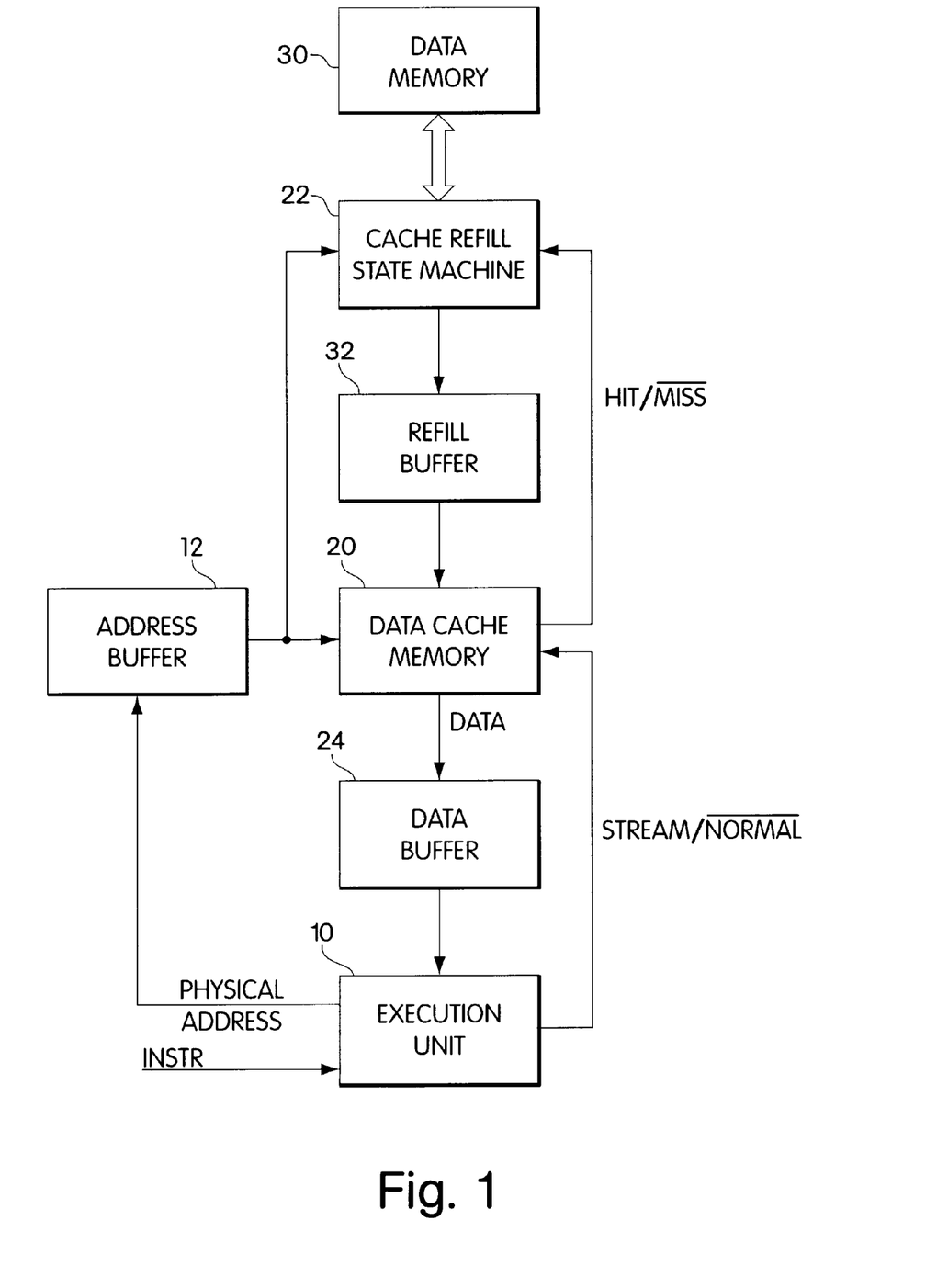
FIG. 1 is a block diagram of a portion of a computer, showing a data cache system and associated elements.

A partial block diagram of a computer, in accordance with an embodiment of the invention, is shown in FIG. 1. Portions of the computer associated with operation of a data cache memory are shown. Successive instructions of a program being executed are supplied to an execution unit 10, such as from an instruction cache (not shown). The execution unit 10 generates physical addresses of data required for execution of the instructions. The physical addresses are supplied through an address buffer 12 to a data cache memory 20 and to a cache refill state machine 22. When the data corresponding to the physical address is present in the data cache memory 20, the data is suppled through a data buffer 24 to execution unit 10, and execution of the instruction may proceed. The condition where the required data is present in data cache memory 20 is known as a cache hit. When the required data is not present in data cache memory 20, known as a cache miss, it is necessary to access the required data in a data memory 30 and to refill the data cache memory 20 with the required data, typically by replacing an existing entry in data cache memory 20. The cache refill state machine 22 controls refilling of data cache memory 20 from data memory 30 when a cache miss occurs. The cache refill state machine 22 supplies replacement data, typically a line of data cache memory 20, through a refill buffer 32 to data cache memory 20. The cache refill process is performed in accordance with a predetermined replacement algorithm, such as a least recently used algorithm.

Figure 2:
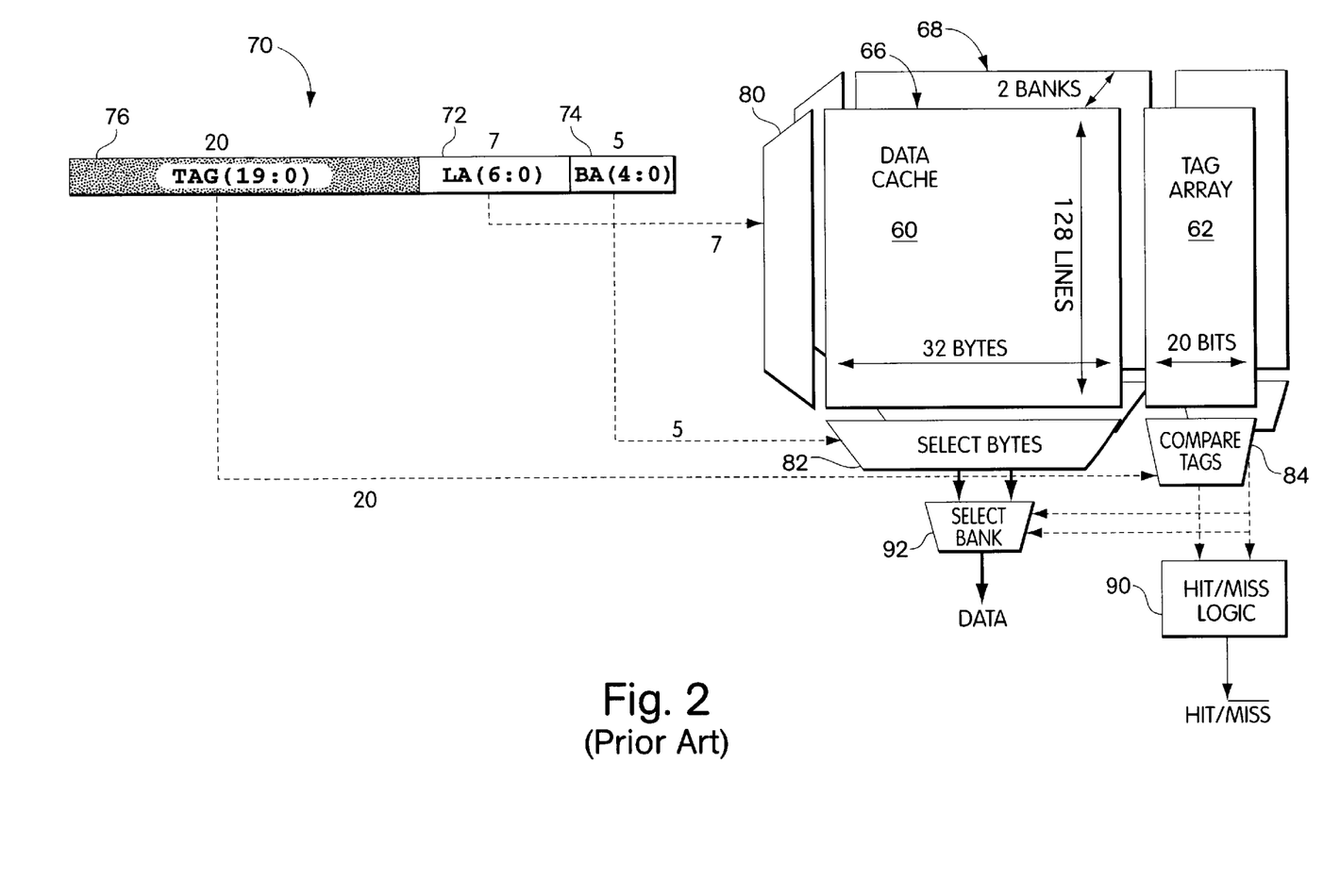
FIG. 2 is a block diagram of a prior art data cache system.

A block diagram of a prior art data cache memory is shown in FIG. 2. The data cache memory includes a data cache 60 for storing data and a tag array 62 for storing tags, which are portions of the physical data addresses. The data cache 60 may be organized as lines of bytes. A tag in tag array 62 corresponds to each line of data cache 60. In the example of FIG. 2, data cache 60 includes 128 lines, each having 32 bytes. The data cache memory may include a single bank, or two or more banks 66, 68 in a set associative configuration. Each bank includes a data cache, a tag array, and addressing circuitry.

The data cache memory is addressed as follows. A physical address 70 is converted to a line address 72, which specifies a line in data cache 60, a byte address 74, which specifies a particular byte in the addressed line, and a tag 76 which includes the remaining bits of physical address 70. The line address 72 and the byte address 74 constitute an index to an entry in the data cache 60. The tag 76 is stored in tag array 62. In the example of FIG. 2, the physical address 70 has 32 bits, including a line address of 7 bits, a byte address of 5 bits and a tag of 20 bits.

When data is being read from the data cache memory by the execution unit 10 during program execution, the physical address 70 is supplied to the data cache memory. The line address 72 is supplied to a decoder 80 which selects one of the lines of data cache 60. The byte address 74 is supplied to a data selector 82 which selects one of the bytes in a line. The tag 76 is supplied to tag array 62 for comparison with the tags stored therein. The comparison function is illustrated in FIG. 2 as a comparator 84. In practice, the tag array 62 approximates the function of a content addressable memory. FIG. 2 shows the simplest case of a direct mapped cache which permits a determination whether a tag matching the tag 76 is stored in tag array 62. The physical address 70 is supplied to banks 66 and 68. The output of each tag array comparison is supplied to hit/miss logic 90. Hit/miss logic 90 determines whether the data specified by physical address 70 is present in the data cache memory and supplies a hit/miss signal to the cache refill state machine 22. When the data is present in one of the banks 66 or 68, the corresponding tag array comparator supplies a select signal to a data selector 92 for selecting the output of the appropriate bank. The byte specified by byte address 74 is output as data to the data buffer 24.

When data is written from data memory 30 into data cache memory 20, a line of data cache 60 is selected by cache refill state machine 22 in accordance with the replacement algorithm. The data from data memory 30 is written into the selected line of data cache 60, and a tag portion of the memory address is written into tag array 62. In the example of FIG. 2, bits [4:0] of the physical address correspond to byte address [4:0] in the data cache memory, bits [11:5] of the physical address correspond to line address [6:0] in the data cache memory, and bits [31:12] of the physical address to correspond to tag bits [19:0] in tag array 62.

Figure 3:
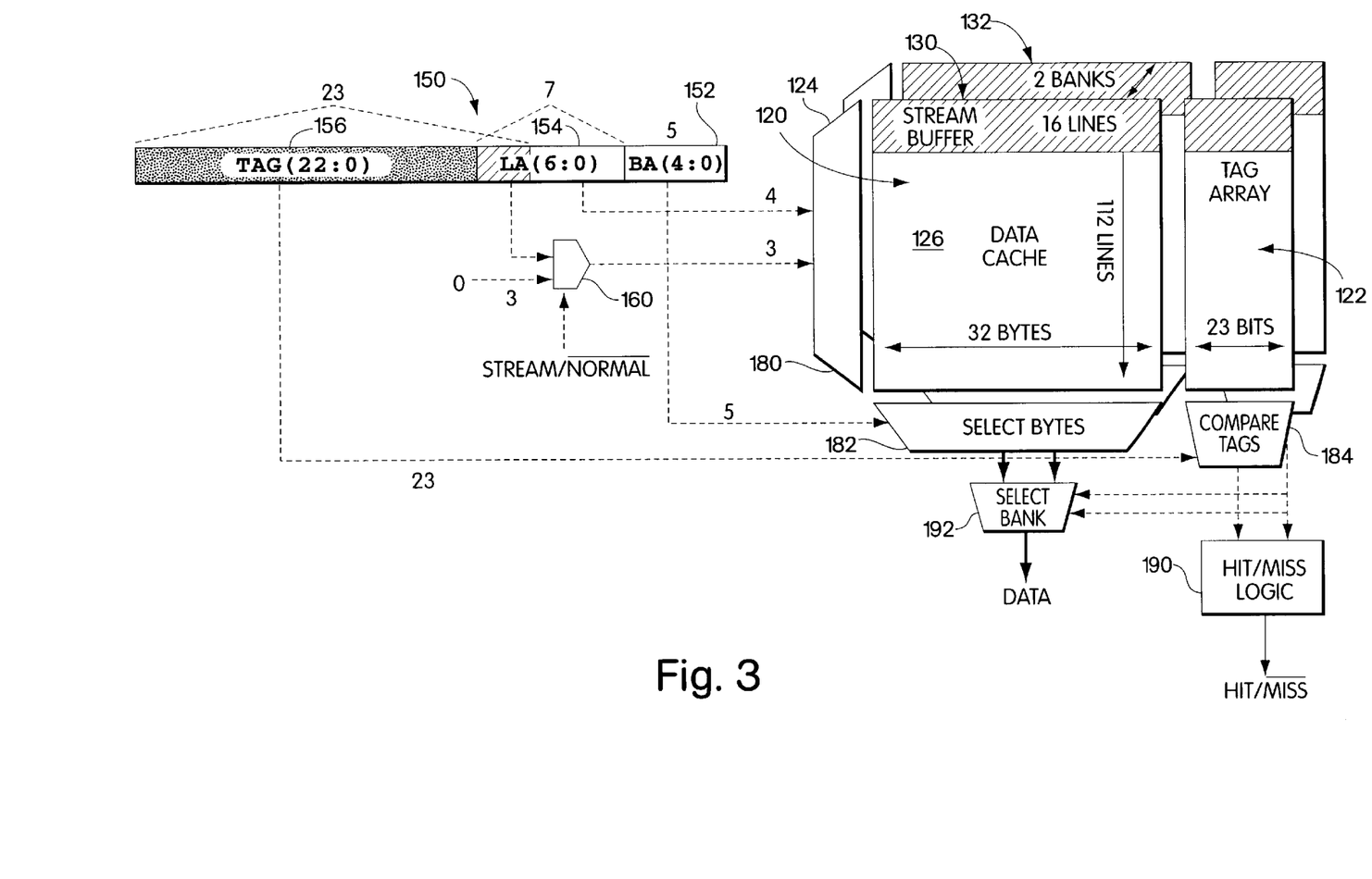
FIG. 3 is a block diagram of a data cache system in accordance with an embodiment of the present invention.

An example of a data cache memory in accordance with the present invention is illustrated in FIG. 3. The data cache memory may operate in a normal mode or in a streaming mode. The operating mode of the data cache memory is determined from the instruction being executed. Thus, some instructions may specify normal mode, whereas others may specify streaming mode. The data cache memory includes a data cache 120 and a tag array 122. The data cache memory may include a single bank, or two or more banks 130, 132 in a set associative configuration. Each bank includes a data cache, a tag array and addressing circuitry as described below.

As in conventional data caches, the data cache 120 stores lines of data, and the tag array 122 stores tag portions of data addresses. Each line in data cache 120 contains multiple bytes. In the normal mode, "normal" data may be stored anywhere in data cache 120 according to the replacement algorithm being utilized. Normal data is the data required for normal program execution and is usually characterized by temporal locality. In the streaming mode, streaming data may be stored in a streaming buffer 124, which is a section of data cache 120, and the tag portions of the streaming data addresses are stored in a section of tag array 122. Streaming data is typically obtained from consecutive memory locations and is characterized by spatial locality. The normal data and the streaming data may be obtained from one memory or from different memories that are within the address space of the execution unit. In summary, normal data may be stored anywhere in data cache 120, including streaming buffer 124, whereas streaming data may be stored only in streaming buffer 124. Only normal data may be stored in a section 126 of data cache 120 outside streaming buffer 124. An advantage of this configuration is that addressing is accomplished relatively easily in either mode.

Since normal data is stored in the streaming buffer 124, normal data may replace streaming data in the streaming buffer 124 as a result of a cache miss in the normal mode. Similarly, streaming data may replace normal data in the streaming buffer 124 in the streaming mode. However, it may be shown that when the capacity of the streaming buffer 124 is small in comparison with the capacity of the data cache 120, the probability of a conflict between streaming data and normal data is relatively low. The probability is given by the ratio of the size of the streaming buffer to the size of the data cache. For example, a streaming buffer of 16 lines in a 128 line data cache has a conflict probability of $16/128 = \sim 12\%$. The conflict probability is reduced in a set associative cache configuration.

The capacity of streaming buffer 124 is preferably small in comparison with the capacity of the data cache 120. In the example of FIG. 3, the data cache 120 has 128 lines, and streaming buffer 124 has 16 lines. The capacity of the streaming buffer is dictated in large part by the operating characteristics of the execution unit and of the memory that provides the streaming data. Among those characteristics is the maximum latency of the execution unit in reading data from the streaming buffer. Another factor to be considered in determining the capacity of the streaming buffer is that its capacity should be small in comparison with the capacity of the data cache so as to reduce the probability of conflict between normal data and streaming data. A streaming buffer having 4 to 16 lines typically meets these requirements. Data caches typically include 128 lines or more.

In an alternative configuration, normal data may be confined to a region outside streaming buffer 124. This configuration has the advantage that conflicts between normal data and streaming data are avoided. However, addressing is relatively difficult in the preferred configuration where the streaming buffer is much smaller than one half of the total capacity of the data cache. For these reasons, the configuration wherein normal data is stored in the entire data cache, including the streaming buffer, is preferred.

Figure 4A:
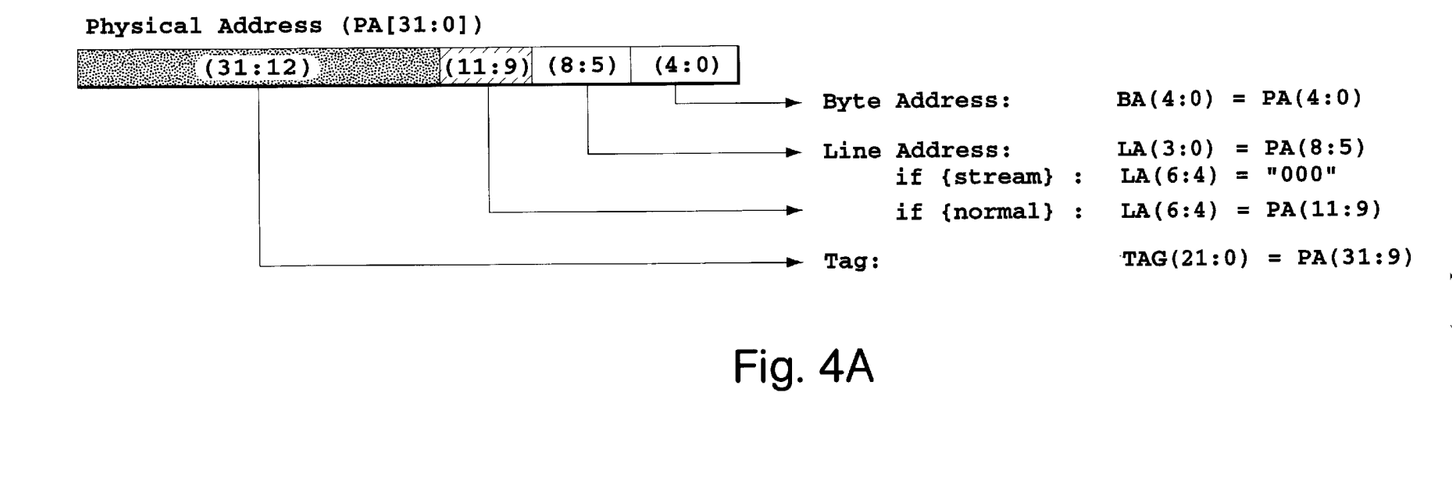
FIG. 4A illustrates conversion of a physical address to a cache address and tag in the data cache system of FIG. 3.
Figure 4B:
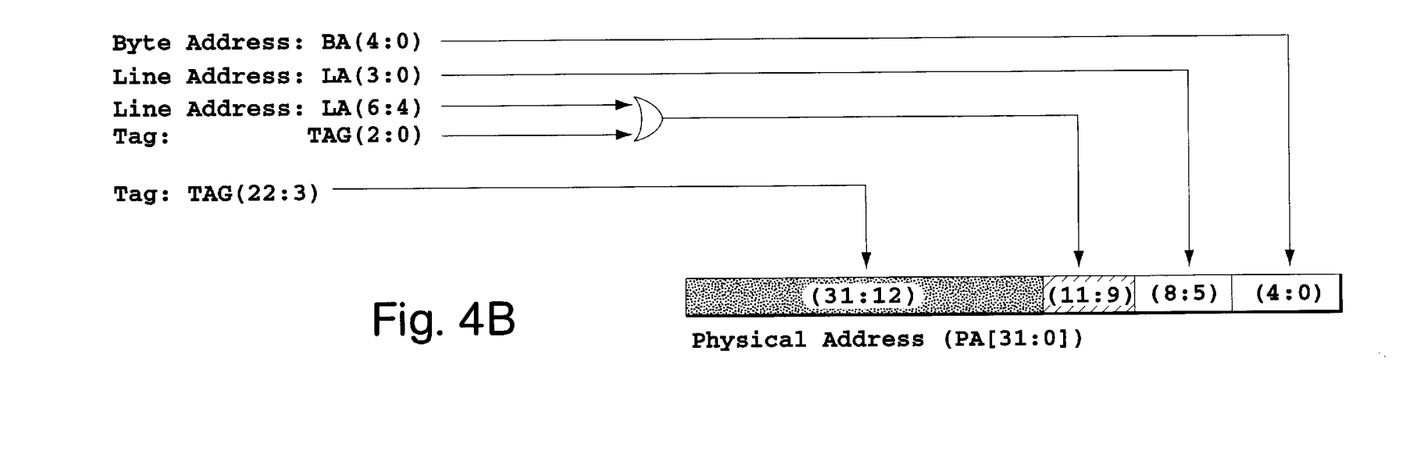
FIG. 4B illustrates conversion of a cache address and tag to a physical address in the data cache system of FIG. 3.

An implementation of a data cache memory that operates in a normal mode and in a streaming mode is described with reference to FIGS. 3, 4A, and 4B. In the example of FIG. 3, data cache 120 has a total capacity of 128 lines, and streaming buffer 124 has a capacity of 16 lines. Each line in data cache 120 contains 32 bytes. The tag array 122 has one entry for each line of data cache 120. As described below, the tag array 122 includes additional bits to accommodate the streaming mode. In the example of FIG. 3, tag array 122 contains 23 bits for each line of the data cache 120, and a physical address 150 has 32 bits. The physical address 150 is converted to a byte address 152, a line address 154 and a tag 156 for addressing of the data cache memory. In both the normal mode and the streaming mode, bits [4:0] of the physical address correspond to byte address [4:0] in the data cache memory, and bits [31:12] of the physical address correspond to tag bits [19:0] in the tag array 122.

The line address and the remaining bits in tag array 122 are dependent on the operating mode. In particular, bits [11:5] of the physical address correspond to line address [6:0] in the normal mode. This permits any of the 128 lines in the data cache 120 to be addressed by the 7-bit line address in the normal mode. In the streaming mode, however, only the streaming buffer 124, corresponding to the first 16 lines of data cache 120, may be addressed. Thus, bits [8:5] of the physical address are used as a line address for the streaming buffer 124, and the three upper order bits of the line address are set to zero. As shown in FIG. 3, control of the upper order bits of the line address may be achieved by a multiplexer 160. The multiplexer 160 receives the upper order bits of the line address (physical address bits [11:9] in the example of FIG. 3) at a first set of inputs and receives logic zeros at a second set of inputs. The multiplexer 160 is controlled by a mode signal which indicates normal mode or streaming mode. The outputs of multiplexer 160 are supplied to the upper order inputs of a decoder 180. Bits [8:5] of the physical address are supplied to the lower order inputs of decoder 180. In the normal mode, bits [11:9] of the physical address are supplied by multiplexer 160 to the upper order inputs of decoder 180. In the streaming mode, logic zeros are supplied by multiplexer 160 to the upper order inputs of decoder 180, so that only the streaming buffer 124 may be addressed.

Those bits of the line address which are not used in the streaming mode are shifted to the tag and are stored in the tag array 122. In the streaming mode, bits [11:9] of the physical address are associated with the tag and correspond to tag bits [22:20] in tag array 122. Thus, the streaming mode has the effect of adding three bits to each entry in tag array 122. In the normal mode, tag bits [22:20] in tag array 122 are set to logic zeros. The comparison between the physical address and the tags stored in tag array 122 is a 23-bit comparison.

The data cache memory of FIG. 3 operates as follows. When data is being read from the data cache memory by the execution unit 10 during program execution, the physical address 150 is supplied to the data cache memory. In addition, a streaming/normal mode signal is supplied to the data cache memory by the execution unit. The line address is supplied to decoder 180, which selects one of the lines of data cache 120 as described above. The line address 154 includes physical address bits [11:5] for addressing any line in data cache 120 in the normal mode. The line address 154 includes physical address bits [8:5], with the remaining 3 bits set to zero, for addressing streaming buffer 124 in the streaming mode. The byte address 152 is supplied to a data selector 182, which selects one of the bytes in a line. The tag 156 is supplied to tag array 122 for comparison with the tags stored therein. The comparison operation determines whether a tag matching the tag in the physical address is stored in tag array 122. The physical address is supplied to banks 130 and 132 of the data cache memory. The output of each tag array comparison is supplied to hit/miss logic 190, which determines whether the data specified by the physical address is present in the data cache memory. The hit/miss logic 190 supplies a hit/miss signal to the cache refill state machine 22 (FIG. 1). When the required data is present in one of the banks 130 or 132, the corresponding tag array comparator supplies a select signal to a data selector 192 for selecting the output of the appropriate bank. The byte specified by the byte address is output as data to the data buffer 24.

When data is written from data memory 30 into the data cache memory, a line of data cache 120 is selected for replacement by cache refill state machine 22 in accordance with the replacement algorithm being used. The data from data memory 30 is written into the selected line of data cache 120, and the tag of the memory address is written into tag array 62. When the execution unit specifies the normal mode, replacement may occur in any line of data cache 120. When the execution unit specifies the streaming mode, the data from memory 30 must replace a line in the streaming buffer 124. Addressing during cache refill is performed in the same manner as addressing during reading from data cache memory, as described above.

The use of a normal mode and a streaming mode as described above gives rise to a potential cache coherency problem in which the same data is written to one location in the data cache in the normal mode and is written to another location in the streaming mode. The avoidance of cache coherency problems is the responsibility of the hardware, the compiler or other software.

Figure 5:
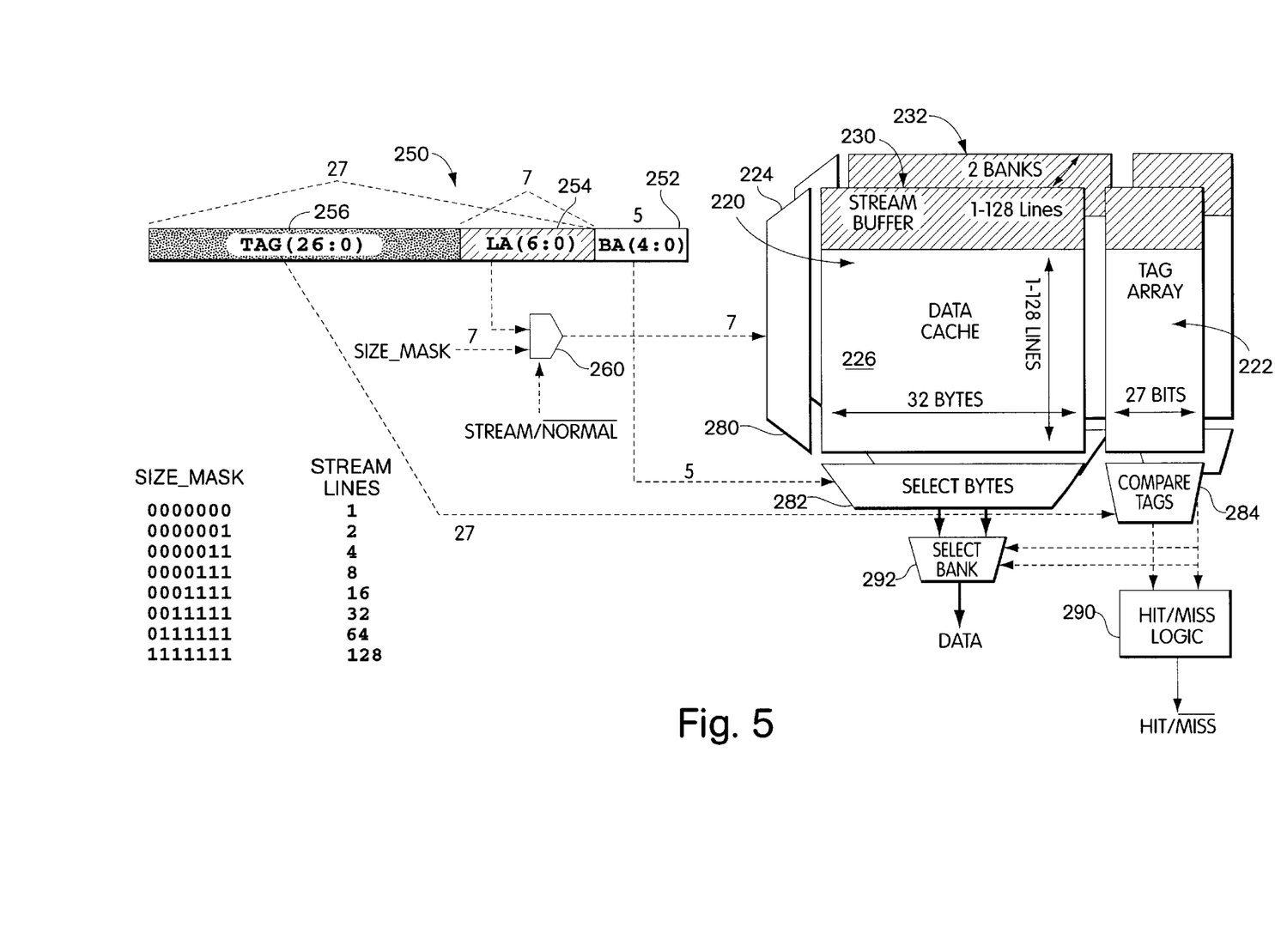
FIG. 5 is a block diagram of a data cache system in accordance with another embodiment of the present invention.
Figure 6A:
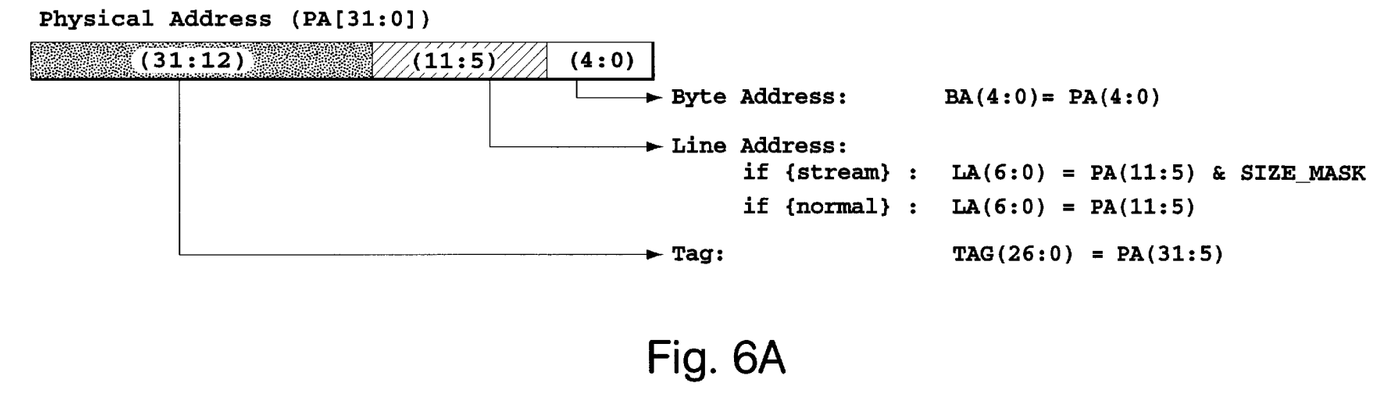
FIG. 6A illustrates conversion of a physical address to a cache address and tag in the data cache system of FIG. 5.
Figure 6B:
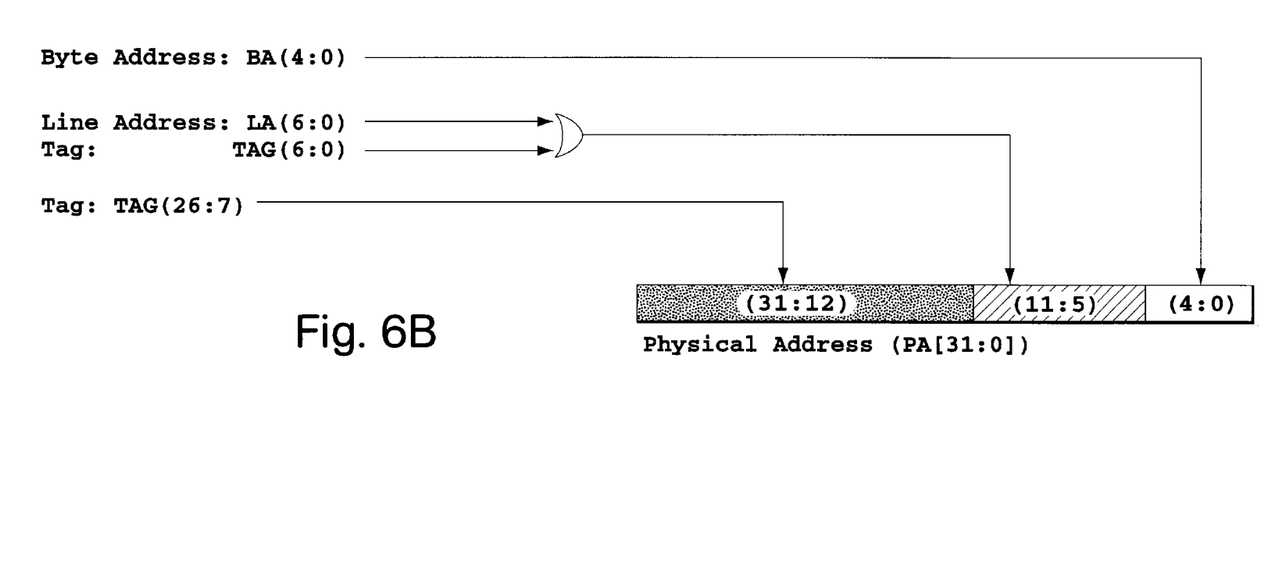
FIG. 6B illustrates conversion of a cache address and tag to a physical address in the data cache system of FIG. 5.

According to a further feature of the invention, the capacity of the streaming buffer may optionally be varied dynamically during operation. An implementation of a data cache memory that operates in a normal mode and in a streaming mode and has a variable size streaming buffer is described with reference to FIGS. 5, 6A and 6B. A data cache memory includes a data cache 220 and a tag array 222. The data cache memory may include a single bank, or two or more banks 230, 232 in a set associative configuration. Each bank includes a data cache, a tag array and addressing circuitry. A streaming buffer 224, which is a section of data cache 220, has variable size. In the example of FIG. 5, data cache 220 has 128 lines, and streaming buffer 224 is variable between one line and 128 lines. It will be understood that in a particular application, the streaming buffer 224 may be varied over a smaller range. The maximum size and the minimum size of streaming buffer 224 may be controlled.

A 32-bit physical address 250 is converted to a byte address 252, a line address 254 and a tag 256 for addressing the data cache memory. The byte address 252 is supplied to data selector 282, which selects one of the bytes in a line. Logic element 260 and decoder 280 select a line of data cache 220 as described below. Tag 256 is supplied to comparator 284 to determine whether a tag matching the tag 256 is stored in tag array 222. The output of the tag array comparison in each bank 230, 232 is supplied to hit/miss logic 290. Hit/miss logic 290 determines whether the data specified by physical address 250 is present in the data cache memory and supplies a hit/miss signal to the cache refill state machine 22 (FIG. 1). When the data is present in one of the banks 230 or 232, the corresponding tag array comparator supplies a select signal to data selector 292 for selecting the output of the appropriate bank. The byte specified by byte address 252 is output as data to the data buffer 24.

As described above, normal data may be stored anywhere in data cache 220, including streaming buffer 224, whereas streaming data may be stored only in streaming buffer 224. Only normal data may be stored in a section 226 of data cache 220 outside streaming buffer 224.

Tag array 222 has one entry for each line of data cache 220. As described below, tag array 222 includes additional bits to accommodate the streaming mode, with the number of additional bits depending on the minimum size of the streaming buffer 224. In the example of FIG. 5, tag array 222 contains 27 bits for each line of data cache 220. In both the normal mode and the streaming mode, bits [4:0] of the physical address correspond to byte address [4:0] in the data cache memory, and bits [31:12] of the physical address correspond to tag bits [19:0] in tag array 222. The line address and the remaining bits in tag array 222 are dependent on the operating mode. Bits [11:5] of the physical address 250 correspond to line address [6:0] in the normal mode. This permits any of the 128 lines in data cache 220 to be addressed by the 7-bit line address in the normal mode. In the streaming mode, only the streaming buffer 224 may be addressed, and the size of the streaming buffer 224 may be varied.

The variable size streaming buffer 224 may be implemented using a control register to store a mask. As shown in FIG. 5, a mask called Size-mask from the control register is logically anded with the line address 254 of the physical address 250 in logic element 260. By selecting values of the Size-mask, selected sections of the data cache 220 can be used as streaming buffer 224. In the implementation of FIG. 5, the number of lines in the streaming buffer 224 is an integer power of 2. As shown in the table of FIG. 5, the streaming buffer 224 may have 1 to 128 lines in the lowest part of the line address space. For example, a one line streaming buffer is mapped to line 0, a four line streaming buffer is mapped to lines 0–3, and so on. Other Size-mask tables can be used to assign the streaming buffer 224 to different portions of the data cache 220. Logic element 260 supplies line address 254 to decoder 280 in the normal mode. In the streaming mode, logic element 260 supplies the line address 254, logically anded with the Size-mask, to the decoder 280. Logic element 260 is controlled by the streaming/normal mode signal.

Those bits of the line address which are not used in the streaming mode are shifted to the tag and are stored in the tag array 222. In the example of FIG. 5 up to seven additional bits may be stored in each entry of tag array 222. The tag array 222 must have sufficient capacity to accommodate the unused address bits for the minimum size streaming buffer 224. As fewer bits are needed to address streaming buffer 224, the leftover bits are stored in tag array 222. Conversely, when the capacity of the streaming buffer is increased, additional line address bits are required, and the number of bits in the tag is reduced. Where the line address 254 has L bits and the streaming buffer is variable between $2^b$ lines and $2^L$ lines, L–b additional tag bits are required in tag array 222. Thus in the example of FIG. 5, the size of the streaming buffer 224 can be varied between one line (b=0) and 128 lines (L=7), and seven additional tag bits are required.

The additional cost of a data cache memory having a variable size streaming buffer includes additional tag bits, which require a larger tag array, and additional decoding logic to generate the physical address from the tag and line address. However, the additional decoding logic is, in practice, negligible.

The invention has been described in connection with particular examples for ease of understanding. However, it will be understood that the examples are in no way limiting as to the scope of the invention. For example, the physical address may have any number of bits and the bits may be divided differently between the byte address, line address and the tag, depending on the configuration of the data cache memory. Furthermore, the number of lines in the data cache and the number of bytes in each line may be varied. The fraction of the data cache assigned to the streaming buffer may be varied. As described above, the data cache memory may include one or more banks.

The present invention provides a data cache memory which may operate in a normal mode with data having a large degree of temporal locality, and in a streaming mode with data having a high degree of spatial locality. The dual mode operation is achieved with a minimum amount of additional circuitry and software overhead.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A data cache system for operation with an execution unit for processing data and a memory for storing data, comprising:

a data cache memory for temporarily storing data from the memory for access by the execution unit; and a data cache controller for controlling reading and writing of data in the entire data cache memory in a normal mode and for controlling reading and writing of data in a streaming buffer in a streaming mode, said streaming buffer comprising a first section of said data cache memory that is available for reading and writing of data in said normal mode and in said streaming mode, wherein a second section of said data cache memory outside said streaming buffer is available for reading and writing of data in said normal mode and is not available for reading and writing of data in said streaming mode, wherein the selection of either said normal mode or said streaming mode is controlled by a mode signal derived from an instruction being executed by said execution unit and said mode signal is supplied to said data cache system from said execution unit and wherein said mode signal represents said normal mode in response to a first instruction that specifies said normal mode and represents said streaming mode in response to a second instruction that specifies said streaming mode.

2. A data cache system as defined in claim 1 wherein the streaming buffer has a capacity that is small in comparison with the capacity of said data cache memory.

3. A data cache system as defined in claim 1 wherein the streaming buffer has a capacity that is fixed.

4. A data cache system as defined in claim 1 wherein the streaming buffer has a capacity that is variable in response to the value of a size control signal.

5. A data cache system as defined in claim 1 wherein said data cache memory includes a data cache and a tag array and wherein said data cache memory is accessed by an address including a tag and an index, said data cache controller including means for associating one or more bits of said address with said index in the normal mode and for associating said one or more bits of said address with said tag in the streaming mode.

6. A data cache system as defined in claim 5 wherein said index includes a line address for addressing a line of said data cache and wherein said data cache controller includes means for setting one or more bits of said line address to deasserted in the streaming mode and for setting one or more bits of said tag to deasserted in the normal mode.

7. A data cache system for operation with an execution unit for processing data and a memory for storing data, comprising:
  a data cache memory for temporarily storing data from the memory for access by the execution unit; and
  a data cache controller for controlling reading and writing of data having temporal locality in the entire data cache memory in a first mode and for controlling reading and writing of data having spatial locality in a buffer in a second mode, said buffer comprising a first section of said data cache memory that is available for reading and writing of data having temporal locality in said first mode and is available for reading and writing of data having spatial locality in said second mode, wherein a second section of said data cache memory outside said buffer is available for reading and writing of data having temporal locality in said first mode and is not available for reading and writing of data having spatial locality in said second mode, wherein the selection of either said first mode or said second mode is controlled by a mode signal derived from an instruction being executed by said execution unit and said mode signal is supplied to said data cache system from said execution unit and wherein said mode signal represents said first mode in response to a first instruction that specifies said first mode and represents said second mode in response to a second instruction that specifies said second mode.

8. A data cache system as defined in claim 7 wherein said buffer has a capacity that is small in comparison with the capacity of said data cache memory.

9. A data cache system as defined in claim 7 wherein said buffer has a capacity that is fixed.

10. A data cache system as defined in claim 7 wherein said buffer has a capacity that is variable in response to the value of a size control signal.

11. A data cache system as defined in claim 7 wherein said data cache memory includes a data cache and a tag array and wherein said data cache memory is accessed by an address including a tag and an index, said data cache controller including means for associating one or more bits of said address with said index in the first mode and for associating said one or more bits of said address with said tag in the second mode.

12. A method for operating a data cache memory with an execution unit for processing data and a memory for storing data, comprising the steps of:
  providing a mode signal, derived from an instruction being executed by said execution unit, to control the selection of either a normal mode or a streaming mode and supplying said mode signal from said execution unit to said data cache memory, wherein said mode signal represents said normal mode in response to a first instruction that specifies said normal mode and represents said streaming mode in response to a second instruction that specifies said streaming mode; and
  reading and writing data in the entire data cache memory in said normal mode; and
  reading and writing data in a streaming buffer in said streaming mode, said streaming buffer comprising a first section of said data cache memory that is available for reading and writing of data in said normal mode and in said streaming mode, wherein a second section of said data cache memory outside said streaming buffer is available for reading and writing of data in said normal mode and is not available for reading and writing of data in said streaming mode.

13. A method as defined in claim 12 wherein said streaming buffer has a capacity that is small in comparison with the capacity of said data cache memory.

14. A method as defined in claim 12 further including the step of varying the capacity of said streaming buffer in response to the value of a size control signal.

15. A method as defined in claim 12 wherein said data cache memory includes a data cache and a tag array and wherein said memory is accessed by an address including a tag and a line address, wherein the step of reading and writing normal data includes associating one or more bits of said address with said line address in the normal mode and wherein the step of reading and writing streaming data includes associating said one or more bits of said address with said tag in the streaming mode.

16. A method for operating a data cache memory with an execution unit for processing data and a memory for storing data, comprising the steps of:
  providing a mode signal, derived from an instruction being executed by said execution unit, to control the selection of either a first mode or a second mode and supplying said mode signal from said execution unit to said data cache memory, wherein said mode signal represents said first mode in response to a first instruction that specifies said first mode and represents said second mode in response to a second instruction that specifies said second mode; and
  reading and writing data having temporal locality in the entire data cache memory in said first mode; and reading and writing data having spatial locality in a buffer in said second mode, said buffer comprising a first section of said data cache memory that is available for reading and writing of data having temporal locality in said first mode and is available for reading and writing of data having spatial locality in said second mode, wherein a second section of said data cache memory outside said buffer is available for reading and writing of data having temporal locality in said first mode and is not available for reading and writing of data having spatial locality in said second mode.

17. A method as defined in claim 16 wherein said buffer has a capacity that is small in comparison with the capacity of said data cache memory.

18. A method as defined in claim 16 wherein said data cache memory includes a data cache and a tag array and wherein said data cache memory is accessed by an address including a tag and a line address, wherein the step of reading and writing data having temporal locality includes associating one or more bits of said address with said line address in the first mode and wherein the step of reading and writing data having spatial locality includes associating said one or more bits of said address with said tag in the second mode.

19. A method as defined in claim 16 further including the step of varying the capacity of said buffer in response to the value of a size control signal.

\* \* \* \* \*